March 30, 1965 C. D. WILLSON 3,175,856
AUTOMOTIVE DOMESTIC ENSEMBLES
Filed Sept. 26, 1962
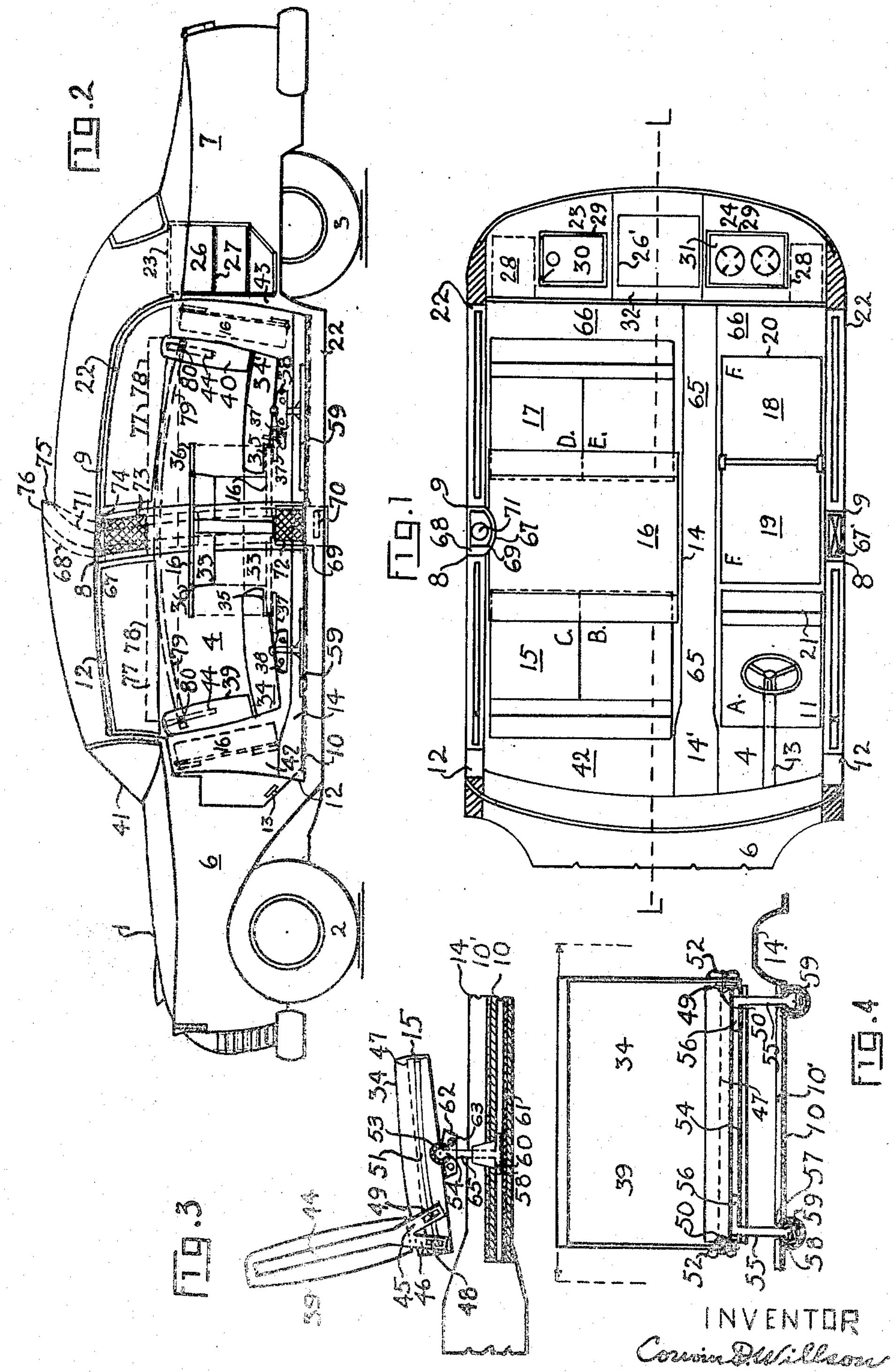

United States Patent Office 3,175,856
Patented Mar. 30, 1965

1

3,175,856
AUTOMOTIVE DOMESTIC ENSEMBLES

Corwin D. Willson, 525 Goldengate St., Lake Orion, Mich.

Filed Sept. 26, 1962, Ser. No. 226,405
5 Claims. (Cl. 296—23)

This invention relates to automotive ensembles making a six-passenger automobile of stock family car type safer in dangerous traffic, more homelike and far more useful both on and off the highway, moving or parked. This application is a continuation in part of my co-pending application Ser. No. 152,593, filed Nov. 15, 1961 now Patent Number 3,097,876 which was a continuation in part of the co-pending application Ser. No. 744,419 filed June 25, 1958 and to mature Oct. 16, 1962 as Pat. No. 3,058,769 which was related to an unbroken chain of applications going back to subsequently abandoned application Ser. No. 437,708, filed April 4, 1942, one of the applications, Ser. No. 774,763, filed Sept. 18, 1947 issuing as Pat. No. 2,638,374.

The primary object of this invention is an ensemble of automotive components shown and claimed in the co-pending parent application Ser. No. 152,593 but withdrawn as being of a non-elected species.

Another object of the invention is an ensemble that right next to the rearward of two doorways in one side of the passenger compartment of a sedan type automobile comprises a dresser for the storage of guns, tackle, typewriter and letter files, books or housekeeping facilities all within manual reach of passengers in sitting posture.

Another object of the invention is an automotive ensemble that enables all passengers except the driver to ride from choice rearward-facing as a safety measure in seats forwardly shiftable to protect the eyes of viewers of a television set at the back end of the compartment.

Another object of the invention is an ensemble of dinette components sitting five passengers on three sides of tabletop separately from a seat for the driver whereby all passengers except the driver may enjoy table games or a repast in swift transit.

Another object of the invention is an ensemble giving a choice of three storage places for a demounted tabletop above the floor of the compartment depending on whether seats for four passengers are face-to-face, back-to-back, both forward-facing or both rearward-facing.

Another object of the invention is an ensemble that makes easy the swift removal from the passenger compartment of all seats except a single seat for the driver only, when the compartment is needed for the haulage of other than human cargo.

Another object of the invention is an ensemble made up of fore and aft double seats on one side and fore and aft single seats on the opposite side of an upwardly protruding backbone or driveshaft tunnel that bottoms a fore-and-aft passage.

Another object of the invention is a dinette specially heated to warm the five or six occupants of the dinette without the engine running.

These and other novel features and objects of the invention are hereinafter more fully described and claimed and the preferred form of my automotive ensemble is shown in the accompanying drawings in which:

FIG. 1 is the floor plan of the ensemble between the storage trunk at one end and the engine compartment at the opposite end of an automobile of sedan type.

FIG. 2 is in part a side view of the automobile and in part a section taken on the longitudinal center line L—L of FIG. 1.

FIG. 3 details in a front view a passenger seat of the ensemble as supported both for fore-and-aft and latera,l shifting of the seat in and from the compartment.

2

FIG. 4 is an end view partly in section of the seat of FIG. 3.

As shown in the drawings, the six-passenger automobile body 1 is supported on forewheels 2 and aftwheels 3 and the sole passenger compartment 4 extends between engine compartment 6 and trunk 7 at opposite ends of body 1. Passenger compartment 4 is entered by front doorways 8 and aft doorways 9 on opposite sides of the body, although one or more of the doorways may be omitted. In the language of the industry, body 1 is of the family-car type known as "four-door sedan." The bottom or floor 10 of compartment 4 provides leg and foot room for all passengers both when forward facing and when rearward-facing and the seating consists of a single seat 11 exclusively for passenger A next to foredoor 12 and facing driving controls 13. On the opposite side of transversely off-center upward protrusion 14 above the general level of floor 10 on opposite sides of the protrusion 14, is double front seat 15 for passengers B and C. This seat is shown temporarily rearward-facing a four-sided tabletop 16 having one side demountably secured by means old in the art to the fixed sidewall of body 1 separating doorways 8 and 9. Facing tabletop 16 across the same from foreseat 15 is double aftseat 17 for passengers D and E and across upward protrusion 14 from double aftseat 17 is a single aftseat 18 for passenger F and having seat-back 19 pivoted forwardly and downwardly leveled alongside one side of tabletop 16 so that passenger F may join passengers B, C, D and E at table in transit and when parked driver A may also sit next to passenger F on the temporary seat made up of leveled seat-back 19 and bottom cushion 20 of aftseat 18 without, as in my Pat. No. 3,058,769, in any way involving seat 11 for driver A. In fact seat-back 21 of driving seat 11 is secured to seat 11 by means that keep seat-back 21 constantly forward-facing driving controls 13.

It will be noted that front seats 11 and 15 extend in the same transverse vertical plane through foredoors 12 so that foredoorways 8 extend well ahead of and behind the two seats. Aftseats 17 and 18 extend in the same transverse vertical plane through aftdoors 22 so that aftdoorways 9 extend well ahead of and behind the two seats. Upward protrusion 14, found in present day cars in longitudinal center axis L—L, takes up in such cars the foot room of passengers seated fore and aft in that axis and as car bodies are slung lower and lower, seating of the middle front seat passenger, because of the upward protrusion of the transmission housing in front-engine cars, is being eliminated. Placing a pair of double seats on one side and a pair of single seats on the opposite side of upward protrusion 14 eliminates the need of the number of passengers being decreased in the average car from six to five and herein the relationship of doorways to transverse seating eases direct occupancy of the seats from the open doorways regardless of whether seats 15, 17 and 18 are separately forward-facing or rearward-facing.

Right next to aft doorway 9 and extending wholly across body 1 above and between aftwheels 3 is a cabinet or dresser 23 made up of workshop 24 below rearview window 25, dresser 23 being interiorly divided into a number of enclosures 26 by shelves 27 and drawers 28. Dresser 23 may be fitted up in various ways to meet a variety of tastes. For the newsman or writer it may house a typewriter, files, reference books. For the sportsman, it may house guns and tackle. For women, it may be fitted up like a boudoir. Here, however, it is a housekeeping unit. The top of dresser 23 has two flat closures 29, one openable to give access to a sink or lavatory 30, the other openable to give access to a cookstove 31. A mid-section of dresser 23 may be a cold-food storage enclosure 32. When flat closures 29 and front of enclosure 32 are closed there is no outward sign of the fact that dresser 23 serves such practical uses. One of enclosures 26' may be an electric means of audio entertainment such as radio or hi-fi record changer or television or portable television set 26' may be supported on workshop at eye-level and means whereby passengers B, C, D, E and F when rearward-facing may shift their seats substantially forward to protect their eyes when viewing TV are to be described.

Tabletop 16 has soft underside 33 and when demounted, tabletop 16 may be turned soft side up between bottom cushion 34 of temporarily rearward-facing double foreseat 15 and bottom cushion 34' of double aftseat 17. Opposite margins of tabletop 16 comprises pair 36 of dropleaves and the hard undersides of bottom cushions 34 and 34' carry marginal rebates or rabbets 35 that receive tabletop 16 whereupon cleats 37 overlap dropleaves 36 and are held by wingnuts 37' while opposite ends of cleats 37 are caught between undersides of bottom cushions 34 and 34' and beveled stops 38 to be described. By such simple means a sleeping unit or soft-topped berth is made up of dinette components without involving back cushion or seat-back 39 of foreseat 15 or the back cushion or seat-back 40 of aftseat 17.

In prior art, storage for a demounted tabletop is shown in an enclosure extending down into the floor. Where all passengers except the driver may sit face-to-face, back-to-back, all forward-facing or all rearward-facing, the largely out of sight storage of a demounted tabletop above floor level becomes a problem. The tops of seat-backs 39 and 40 are in substantially the same horizontal plane as the transparent windshield 41 and rearview window 25. When seat 15 is rearward-facing, tabletop 16 when demounted may be stored in enclosure 42 above floor 10 and walled by seat-back 39 and foredoor 12. When seat 17 is forward-facing, the demounted tabletop 16 may be stored in enclosure 43 bottomed by floor 10 and walled by seat-back 40 and aftdoor 22. When seat 15 is forward-facing and seat 17 is rearward-facing, demounted tabletop 16 may be stored above floor 10 between the back-to-back seat-backs 39 and 40.

The structure of seats 15 and 17 may be identical and is shown in some detail in FIGS. 3 and 4. The long "low silhouette" of cars of sedan type presently in vogue makes headroom even in seated posture such a problem that the bottom cushions of car seats are given a pronounced downward slant toward the back cushions or seat-backs. To make car seats reversible under these conditions raises problems which railcar seats never had to face and even the means of reversing the seat-backs of railcar seats was complicated. From the first filing in 1942 of an application describing a motorcar having many of the features of the drawings herein, this problem was faced and met if in a complicated manner. In present-day cars, all manner of human contours are forced to fit existing seating which lacks means of adjustment so that a 5', 97 pound woman has to fit the same seat as a 6', 250 pound man.

FIG. 3 relates specifically to foreseat 15, seat-back 39 being mounted on bottom cushion 34 by means of the downward projection of opposite side frame members 44 of seat-back 39, members 44 branching each into two bottom arms 45 and 46 extending alongside rigid lower opposite ends of frame 47 of bottom cushion 34, each of arms 45 and 46 being pierced by aligned apertures or slots 48 housed along the longitudinal center axis of each arm and receiving the outer threaded ends of studs 49 which are caught by heads 50 behind slots 51 housed by opposite ends of frame 47, studs when loosened by turning wingnuts 52 being able to slide fore and aft in slots 51 and up and down in slots 48 by which means the entire seat-back 39 may be swung across bottom cushion 34 to reverse the facing of seat 15 at the same time as the tilt of seat-back 39 is varied within wide limits. This seat-structure does away with the need of small women to place pillows between their backs and the seat-back when driving since the structure described permits seat-back 39 to be locked short of opposite transverse margins of bottom cushion 34 either when forward or rearward-facing and seat-back 39 can accordingly be adjusted to seat children comfortably.

In order that when seat-back 39 is reversed the downward slope of the bottom cushion 34 toward the reversed seat-back 39 may occur automatically, the force of gravity is utilized. Rigid opposite ends of bottom frame 47 are secured to and pivotally balance on tubular housing 53 having along its lower side slot 54 and the seat base securing seat 15 to bottom 10 of the compartment 4 is made up of a pair of spaced standards 55 holding the underside of bottom cushion 34 well above upward protrusion 14 and its wider and higher front end 14' standards 55 extending up through slot 54 and having upper prongs 56 that have a snug sliding fit inside housing 53 whereby bottom-cushion may be slid laterally on standards 55 which at their lower ends pass through fore and aft slots 57 and have lower prongs 58 inside housings 59 which may be made up in part of deformed lengths of the sheet-metal forming the bottom 10 of the compartment 4 or be formed of tubular material. Opposite ends of housings 59 have means, as the widening of slots 57 for disengaging lower prongs 58 entirely from housings 59. Teeth 60 on the undersides of lower prongs 58 rest on a stiffly resilient strip 61 along the bottom side of housing 59 to keep seat 15 in one position except as force is applied to push seat on prongs 58 fore and aft. The normal positions of seat 15, 17 and 18 are centered fore and aft on doorways 8 and 9 so that these seats may be laterally slid out through these doorways to leave seat 11 the only seat in compartment 4 whereupon prongs 58 may be slipped endwise in the housings 59 to the widened slots 57 where they are disengaged to leave only slits in the carpet 10' to give any evidence that seats are quickly set up again by reversing the procedure described. Today's cars have become so elegant that the use of sedan-type cars for haulage is made very difficult since it is apt to soil or tear the seat upholstery, yet every family needs to use the family sedan on occasion for the haulage of other than human cargo. Opposite fore and aft top sides of standards 55 just under slots 54 comprise beveled stops 62 adjustable up or down by fasteners 63 to limit the tilting bottom cushion 34 when set-back 39 is reversed. Stops 62 slide up and down on mid-shank 64 of standards 55 when fasteners 63 are loosened.

Top surface of upward protrusion 14 or driveshaft tunnel is flat to bottom transversely off-center fore and aft passage 65. Reversal of seat-back 40 to be rearward-facing and slight forward-shift of aft doubleseat 17 widens transverse passage 66 that lies athwart line L—L and leads to aft doorway 9 between bottom cushion 35 and dresser 23. This increases the leg and foot room of rearward-facing occupants of seat 17 and makes it possible for the occupants to reach out and manipulate the components of dresser 23 and utilize the facilities under or on worktop 24 (such as TV set 26') in sitting posture whereas, in the art, such facilities have to be utilized in standing posture compelling either an expansion of the car body or a body of permanent standing interior verticality. It is a great economy to have all the components and contents of dresser 23 be within arm's reach of three seated components. It is also a great safety factor since it gives rearward-seating passengers activities inducing them to ride in the safest position where they can't be thrown forward should the car in its forward movement collide with something that makes forward-facing passengers so susceptible to injury and death on the highway. By means of the substantial forward shift of aftseats 17 and 18 that the length of housings 59 shown in FIG. 2 makes possible, all occupants of the aftseats may view television in comfort both in transit and when parked without eye damage. When passenger F is sitting facing tabletop 16 on the leveled seat-back 19, without any further manipulation of the components of seat 18, passenger F may shift himself to face dresser 23 where in seated posture he can flip the flapjacks being cooked on cookstove 31, all this without bothering passenger A at driving controls and busy in traffic.

Waste heat from the running engine is utilized to space-heat cars but in the dinette shown in the drawings, upwardly and forwardly extending seat-back 39 is interposed for more than half the width of the body between dinette occupants and engine heat released near the instrument panel in present day cars. Thus an auxiliary source of heat is required and the drawings show a specially-heated dinette. The wall 67 between doorways 8 and 9 is thickened to house duct 68 and near or below floor 10 is space heater 69 with combustion burner 70. From housing of space heater 69 a vent-pipe or smoke pipe 71 rises in duct 68 which has a lower grilled opening 72 and an upper grilled opening 73 above which are dampers 74 for closing duct 68 in cold weather. Cold air enters lower opening 72 is heated by housing 69 and smoke pipe 71 and comes heated from upper opening 73, and this flow may be hastened by a fan not shown. Above dampers 74, smoke pipe 71 continues up into top of the body 1 to backwardly exposed vent 75 in roofstep 76 down from a higher to a lower area of the top of body 1. Forward motion of body 1 creates a minus atmospheric pressure rearwardly of roofstep 76 drawing products of combustion from smoke pipe 71. Duct 68 may be independently vented in roofstep 76 so that in warm weather, opening of dampers 74 will draw stale air from the dinette upwardly in duct 68 and from the body. A similar duct in opposite body wall 67' may do the body ventilating independently of duct 68.

Upper berth 77 is made up of collapsible components so that it may be formed with air-mattress 78 into a small bundle and carried either in trunk 7 or on top of the body. Since a wide variety of such berths have been shown in co-pending applications Ser. No. 152,593, now Patent Number 3,097,876, and Ser. No. 155,246, it suffices here merely to say that upper berth 77 has upwardly arched tubular side supports 79 secured by fasteners 80 to integral frames 44 of back cushions 39 and 40 so that the full weight of the double-decker sleeping unit made up of dinette components and upper berth 77 is supported by the floor 10 of the compartment 4. Most of the features of this invention are equally applicable to a body having the engine at the rear end.

Despite the many practical features described, body 1 looks outside like a stock sedan and inside compartment 4, when foregap 65 between seats 11 and 15 is closed by the lateral sliding of seat 15 as described, and when aftgap 65 between seats 17 and 18 is similarly closed, the inside of compartment 4 with all seats forward-facing is so like that of the average sedan that differences scarcely may be noticed. One of the merits of the ensemble now fully described is that all details of inside and outside appearance which the new-car buying public has come to accept as status symbols have been preserved so that the utilitarian novelty of the structure is slipped slyly in without offense to the sensitive feelings of those whose social status is maintained by conspicuous display.

This utilitarian novelty is substantial. The invention increases passenger safety in dangerous traffic, lessens family dependence on food and shelter of costly and dubious quality, provides means of seating all passengers at a single table when parked, and all except the driver when the body is in motion, provides means of removing from the body swiftly and simply the seating for all passengers except the driver, makes it possible for all passengers except the driver to face rearwardly in times of dangerous transit to watch TV without eye harm, to prepare hot coffee in sitting posture, removes today's upward protrusion of the body backbone or drive shaft tunnel from the foot room of passengers sitting in the longitudinal center axis of the body, makes easy the conversion of dinette components into a soft-surfaced lower berth while leaving the back cushions free to support a collapsible upper berth. All this without radical changes of appearance or the extra cost of bodies of inside standing height which the prior art has required to achieve one or two of these objectives.

Today's sedan is as yet an overpowered speedster overloaded with those mechanical complexities so dear to the new-car buyer but which all go sour on the lower-income used-car-buying masses. They are the ones whose buying of used cars makes the manufacture of new cars possible. They own over three-quarters of our growing-on 70,000,000 motorcars and this invention takes mass needs in mind. It is past time when, with the increase of leisure, we must all face the problem of better sheltering family mobility. This invention grapples with and finds a solution to this problem.

The drawings, being illustrative only, are more or less diagrammatic in character to show the preferred relation of the parts. It will be understood that changes in various parts may be made without vitally altering the character of the whole or departing from the spirit and scope of the invention as set forth in the appended claims; and all changes which come within the meaning and range of equivalency of the claims are therefore intended to be embraced therein.

Having thus defined and fully described my invention, its utility in traffic and when parked, its domestic and home-like character, its simplicity of structure, mode of operation and use, what I claim and desire to secure by Letters Patent of the United States is:

1. A domestic ensemble comprising a family car body having upright opposite sidewalls between and bordering side doorways fore and aft into a passenger compartment seating as many as seven passengers in four separate seats each alongside a different one of said four doorways and ahead of a transverse passage from one aft doorway to the other, and a worktop next to and behind both aft doorways and topping a cabinet accessible from one side to the opposite side of the body from said passage, and a tabletop having one side demountably secured to one of said sidewalls to extend alongside an aft doorway; one of said seats fixedly forward facing driving controls, and another of said seats alongside an aft doorway made up to seat one passenger facing said tabletop and to seat a second passenger facing and within manual reach of said worktop, said last-named seat being made up of the bottom and back cushions of a rearward-facing backseat for a single passenger, and said back cushion being pivotally secured to said bottom cushion to be swung forward and downwardly leveled alongside said table top in the space between said seat facing driving controls and said bottom cushion.

2. A domestic ensemble comprising a family car body having upright opposite sidewalls between and bordering side doorways fore and aft into a passenger compartment seating as many as seven passengers in four separate seats each alongside a different one of said four doorways and ahead of a transverse passage from one aft doorway to the other, and a worktop next to and behind both aft doorways and topping a cabinet accessible from one side to the opposite side of the body from said passage, and a tabletop having one side demountably secured to one of said sidewalls to extend alongside an aft doorway: one of said seats fixedly forward facing driving controls, and another of said seats alongside an aft doorway made up to seat one passenger facing said tabletop and to seat a second passenger facing and within manual reach of said worktop, the other two of said four seats being face-to-face next to the opposite side of the body and having upwardly diverging back cushions stiffened by integral frames, and a berth being made up from elements including a mattress and siderail supports therefor and fasteners securing opposite ends of said siderail supports to said integral frames to be upwardly arched therebetween and said mattress being supported by and between said upwardly arched siderail supports and said back cushions.

3. A domestic ensemble comprising an automobile body having on opposite sides a total of several doorways into a passenger compartment housing seats next to said doorways, one of said seats having a bottom cushion pivotally held on a seat-base by prongs slidingly snugly encased in a tubular member fixed centrally of the bottom cushion to extend transversely thereof, said prongs constituting the upper ends of supports passing down through a slot that extends from end-to-end of said tubular member, and the lower ends of said supports being secured to the body; said bottom cushion being rockable on said prongs by a passenger sitting on said bottom cushion.

4. The structure of claim 3 wherein said bottom cushion is laterally slidable on said prongs toward either side of the body and directly out the contiguous doorway to make room for other than human cargo.

5. The structure of claim 3 wherein means securing the lower ends of said supports to the body permit said supports to be shifted forwardly nearer the forejamb of the contiguous doorway, or shifted rearwardly toward the aftjamb thereof.

References Cited by the Examiner

UNITED STATES PATENTS

| | | | |
|---|---|---|---|
| D. 159,326 | 7/50 | Eldridge | 296—23 |
| 1,163,056 | 12/15 | Zimmerman | 296—23 |
| 1,196,908 | 9/16 | Walker | 297—97 |
| 1,533,354 | 4/25 | Stahl | 296—65 |
| 1,658,110 | 2/28 | Warren | 296—24 |
| 2,028,829 | 1/36 | Fageol | 180—54 |
| 2,577,836 | 12/51 | Willson | 296—23 |

FOREIGN PATENTS 969,334 5/58 Germany.

OTHER REFERENCES

A "Motorlounge," Article in the Autocar, Dec. 18, 1936.

A. HARRY LEVY, *Primary Examiner.*

PHILIP ARNOLD, *Examiner.*